(12) United States Patent
Yamade

(10) Patent No.: US 12,133,571 B2
(45) Date of Patent: Nov. 5, 2024

(54) SHOE

(71) Applicant: ASICS CORPORATION, Kobe (JP)

(72) Inventor: Takashi Yamade, Kobe (JP)

(73) Assignee: ASICS CORPORATION, Kobe (JP)

( * ) Notice: Subject to any disclaimer, the term of this patent is extended or adjusted under 35 U.S.C. 154(b) by 528 days.

(21) Appl. No.: 17/255,973

(22) PCT Filed: Jun. 28, 2018

(86) PCT No.: PCT/JP2018/024556
§ 371 (c)(1),
(2) Date: Dec. 23, 2020

(87) PCT Pub. No.: WO2020/003433
PCT Pub. Date: Jan. 2, 2020

(65) Prior Publication Data
US 2021/0321714 A1    Oct. 21, 2021

(51) Int. Cl.
*A43B 13/04*    (2006.01)
*A43B 13/18*    (2006.01)
*B32B 3/26*    (2006.01)
*B32B 3/30*    (2006.01)
*B32B 5/18*    (2006.01)
(Continued)

(52) U.S. Cl.
CPC ............ *A43B 13/04* (2013.01); *A43B 13/187* (2013.01); *B32B 3/266* (2013.01); *B32B 3/30* (2013.01); *B32B 5/18* (2013.01); *B32B 7/02* (2013.01); *B32B 7/027* (2019.01); *B32B 27/065* (2013.01); *B32B 27/20* (2013.01); *B32B 27/32* (2013.01); *B32B 2264/0221* (2013.01); *B32B 2264/403* (2020.08); *B32B 2437/02* (2013.01)

(58) Field of Classification Search
CPC ......... A43B 13/02; A43B 13/04; A43B 13/12; A43B 13/122; A43B 13/1125; A43B 13/188; B32B 3/266; B32B 3/30; B32B 5/18; B32B 7/02; B32B 7/027; B32B 27/065; B32B 27/20; B32B 27/32; B32B 2264/0221; B32B 2264/403; B32B 2437/02
See application file for complete search history.

(56) References Cited

U.S. PATENT DOCUMENTS

| | | | |
|---|---|---|---|
| 2013/0232818 A1 | 9/2013 | Wiener | |
| 2014/0059883 A1* | 3/2014 | Adeagbo | A43B 13/141 36/28 |

(Continued)

FOREIGN PATENT DOCUMENTS

| | | | |
|---|---|---|---|
| DE | 4222724 A1 * | 1/1994 | ............... B05D 3/12 |
| JP | 2007-275275 A | 10/2007 | |

(Continued)

OTHER PUBLICATIONS

Translation to English for DE4222724 A1 via espacenet. accessed Feb. 15, 2023. (Year: 1994).*

(Continued)

*Primary Examiner* — Nancy R Johnson
(74) *Attorney, Agent, or Firm* — Studebaker & Brackett PC

(57) ABSTRACT

Provided in the present invention is a shoe that can be of high quality and easily produced, by forming an outsole with a thermoplastic elastomer showing specific complex viscosities at 140° C. and 180° C.

7 Claims, 9 Drawing Sheets

(51) Int. Cl.
  *B32B 7/02* (2019.01)
  *B32B 7/027* (2019.01)
  *B32B 27/06* (2006.01)
  *B32B 27/20* (2006.01)
  *B32B 27/32* (2006.01)

(56) References Cited

U.S. PATENT DOCUMENTS

2017/0273399 A1* 9/2017 Nishi .................... C08L 53/025
2018/0368515 A1 12/2018 Yamade et al.

FOREIGN PATENT DOCUMENTS

JP       2015-512688 A     4/2015
WO    WO-2016031046 A1 *  3/2016   ............. A43B 13/04
WO       2017094131 A1    6/2017

OTHER PUBLICATIONS

International Search Report issued in PCT/JP2018/024556; mailed Aug. 21, 2018.
Notification of Transmittal of Translation of the International Preliminary Report on Patentability and Translation of Written Opinion of the International Searching Authority; PCT/JP2018/024556; mailed on Jan. 7, 2021.

* cited by examiner

SHOE

FIELD

The present invention relates to a shoe, and more specifically relates to a shoe including a midsole and an outsole.

BACKGROUND

Conventionally, shoes are not only required to be excellent in cushioning performance and lightweight properties, but also required to be excellent in grip performance and wear resistance. Since it is difficult to enable a single member to satisfy all these requirements, a conventional shoe sole is constituted by a plurality of members such as a midsole and an outsole. The midsole is conventionally formed of a polymer foam or the like to cause the shoe to exhibit lightweight properties and cushioning performance. The outsole constitutes a ground-engaging portion that comes in contact with the ground when a wearer of the shoe walks, and is formed of a non-foamed rubber sheet or the like since it is required to be excellent in strength, grip performance, and wear resistance. Conventionally, in producing a shoe, a method is generally employed in which a midsole and an outsole are separately produced, and then bonded together with an adhesive. Patent Literature 1 below describes a method of producing a shoe different from a conventional and general producing method, and describes a method in which a midsole and an outsole are produced using the same resin (ethylene-vinyl acetate copolymer (EVA)), and moreover produced simultaneously with a single forming mold. Patent Literature 1 further describes that heat-fusing them together at the time of molding can improve the productivity of shoes.

CITATION LIST

Patent Literature

Patent Literature 1: JP 2007-275275 A

SUMMARY

Technical Problem

In the producing method as shown in the above Patent Literature, a forming mold is used that has a molding space for forming an outsole and a molding space for forming a midsole that are connected to each other to form a single space. Further, in the producing method as shown in the Patent Literature, the molding space for forming the outsole and the molding space for forming the midsole are respectively filled with EVA, and then are hot-pressed. At this time, the EVA for the outsole is required to exhibit high fluidity at the heating temperature of the hot-pressing in order to form an outsole sufficiently reflecting the shape of the forming mold. However, if the EVA has fluidity that is excessively high, the EVA for the outsole flows out of the molding space for forming the outsole to possibly fail to obtain a product of high quality.

Less attention has been paid to the aforementioned problem so far, and no solution to such a problem has been established. Therefore, it is an object of the present invention to solve such a problem, and is an object of the present invention to provide a shoe capable of being efficiently produced and capable of being a high-quality product.

Solution to Problem

Provided in the present invention is a shoe including: a midsole formed of a polymer foam; and an outsole formed of a thermoplastic elastomer, wherein the outsole and the midsole are heat-fused to each other, and the thermoplastic elastomer has a complex viscosity at 140° C. ($\eta_{140}$) and a complex viscosity at 180° C. ($\eta_{180}$) that satisfy both relational expressions (1) and (2) below:

$$10 \text{ kPa·s} \leq \eta_{140} \leq 300 \text{ kPa·s} \quad (1)$$

$$\eta_{180} \leq 100 \text{ kPa·s} \quad (2)$$

DESCRIPTION OF EMBODIMENTS

Figure 1:
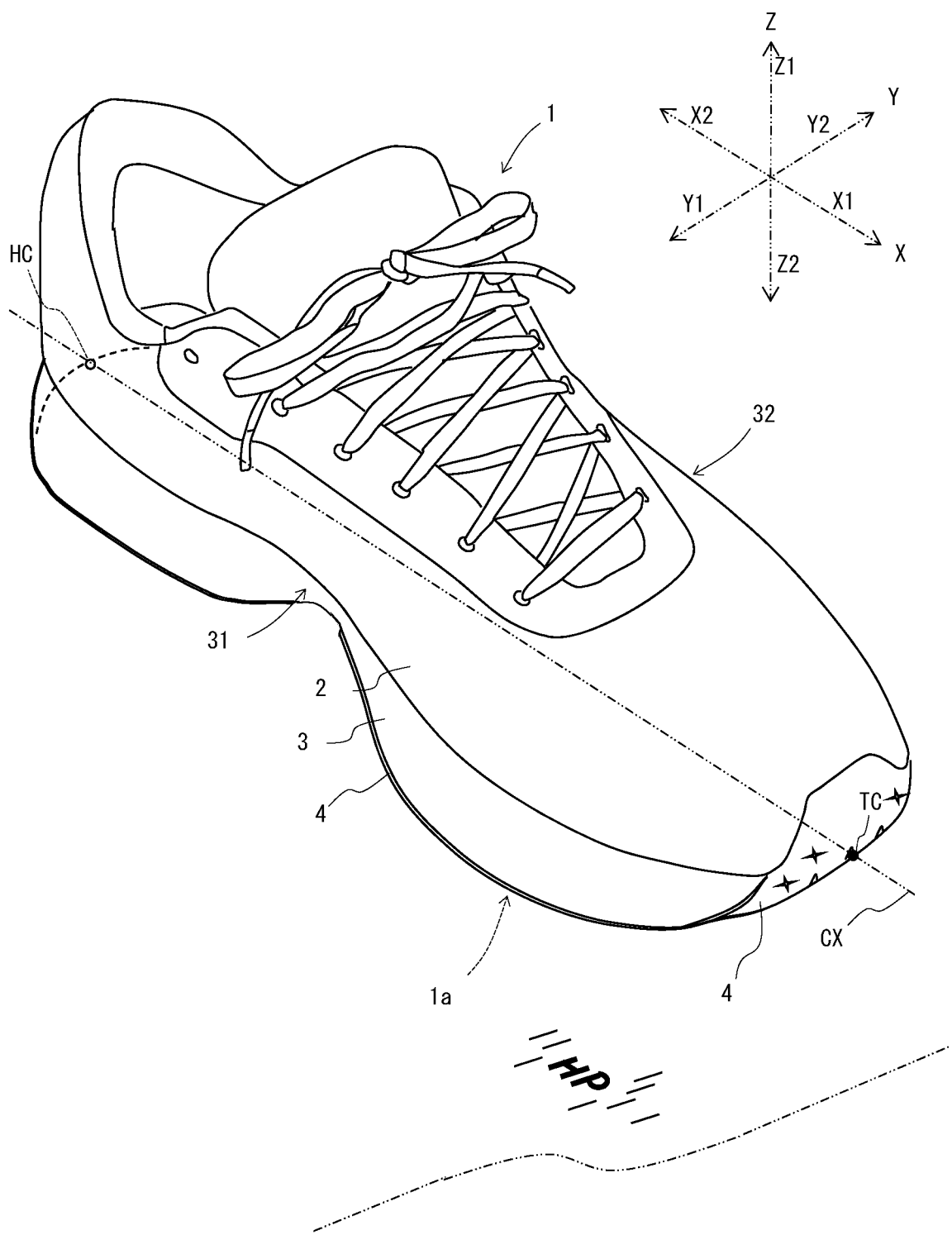
FIG. 1 is a schematic perspective view showing one form of a shoe.
Figure 2:
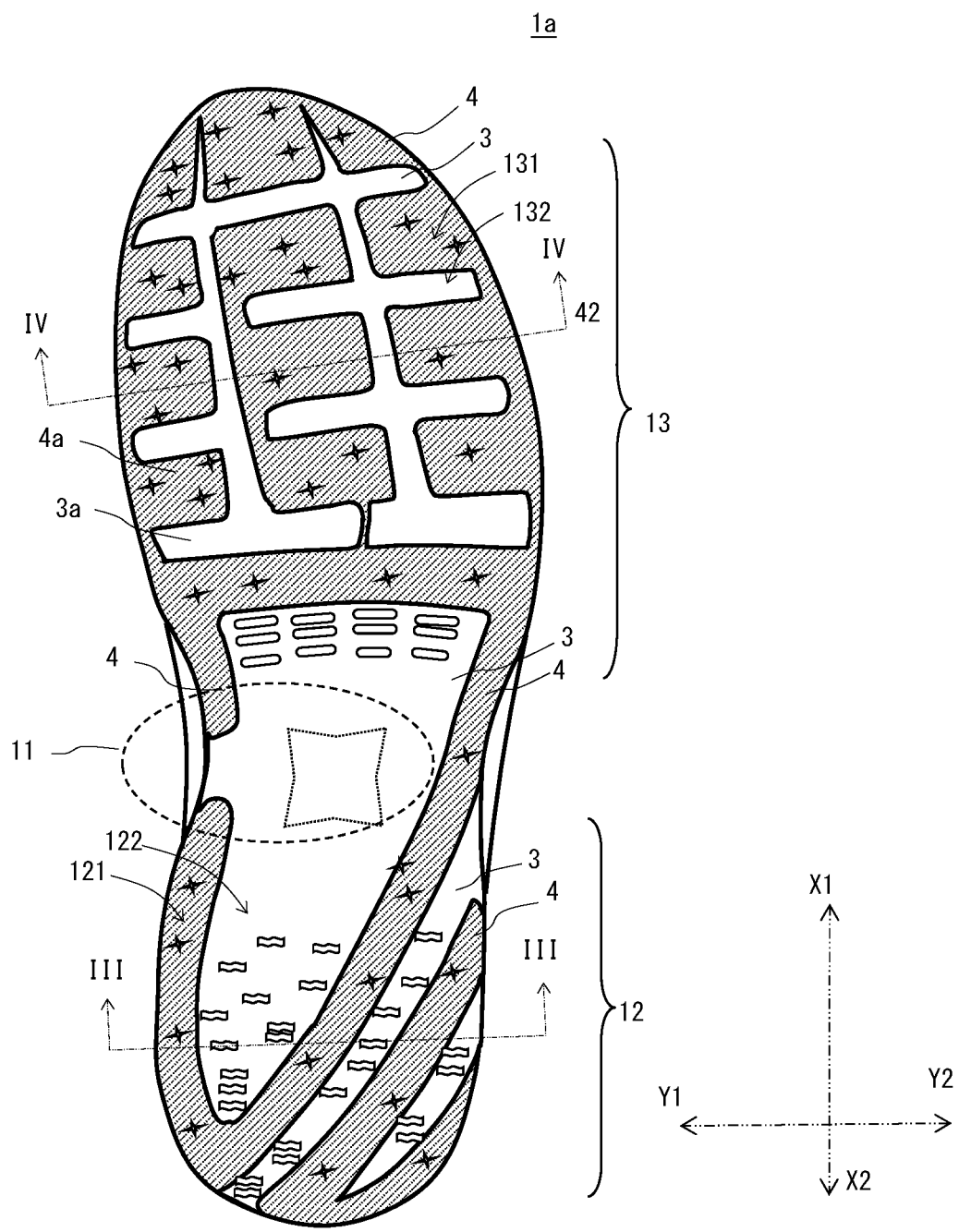
FIG. 2 is a schematic plan view showing the appearance of a shoe sole surface.

A shoe sole member of the present invention will be described below by showing the embodiments thereof. FIG. 1 is a schematic perspective view showing a shoe 1 of this embodiment, and shows the state where the shoe is in contact with the ground when a wearer of the shoe walks. FIG. 2 shows the appearance of the lower surface of the shoe 1 (hereinafter referred to also as a "shoe sole surface 1a"). As shown in the figure, the shoe 1 of this embodiment includes an upper 2 and shoe sole members 3 and 4. The shoe 1 includes a midsole 3 and an outsole 4 as the shoe sole members. Hereinafter, when a description is given on, for example, the shoe 1 shown in FIG. 1, a direction along a shoe center axis CX connecting a heel center HC and a toe center TC may be referred to as a length direction X. Among directions along the shoe center axis CX, a direction X1 directed from the heel to the toe may be referred to as, for example, a forward direction, and a direction X2 directed from the toe to the heel may be referred to as, for example, a rearward direction. Further, among directions orthogonal to the shoe center axis CX, a direction parallel to a horizontal plane HP may be referred to as, for example, a width direction Y. Regarding the width direction Y, a direction Y1 directed to the first toe side may be referred to as, for example, a medial side direction, and a direction Y2 directed to the fifth toe side may be referred to as, for example, a lateral side direction. A vertical direction Z orthogonal to the horizontal plane HP may be referred to as a thickness direction or a height direction. Further, hereinafter, a direction Z1 directed upward in this vertical direction Z may be referred to as an upward direction, and a direction Z2 directed downward may be referred to as a downward direction.

As shown in FIG. 1, the shoe 1 of this embodiment includes the outsole 4 in its bottommost position. The outsole 4 of this embodiment has a sheet shape, and is arranged in the bottommost position of the shoe 1 so that the thickness direction thereof corresponds to the vertical direction Z. The shoe 1 includes the midsole 3 between the outsole 4 and the upper 2 that covers a foot of the wearer from the upper side. The midsole 3 of this embodiment has a flat shape, and is arranged so that the thickness direction thereof corresponds to the height direction Z of the shoe. The lower surface of the midsole 3 is in contact with the upper surface of the outsole 4, and the upper surface of the midsole 3 is in contact with the upper 2 from below.

Figure 3:
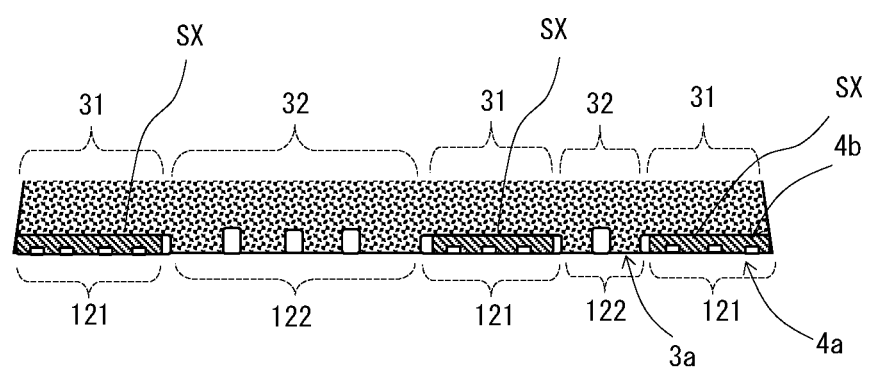
FIG. 3 is a sectional view taken along the line and viewed in the direction of arrows III-III thereof in FIG. 2 (cross section of a first ground-engaging portion).
Figure 4:
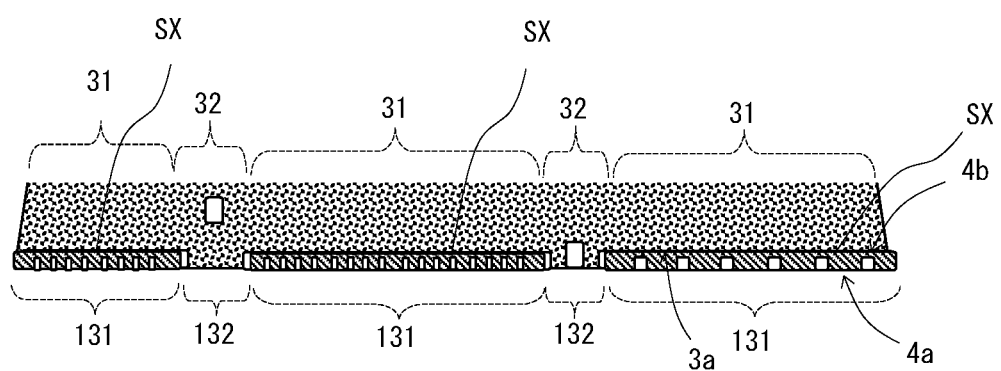
FIG. 4 is a sectional view taken along the line and viewed in the direction of arrows IV-IV thereof in FIG. 2 (cross section of a second ground-engaging portion).

The lower surface of the shoe 1 of this embodiment is slightly recessed upward in a portion corresponding to an arch of the foot of the wearer. This portion is provided with a non-ground-engaging portion 11 that does not come into contact with the ground when the wearer walks. The shoe 1 of this embodiment includes ground-engaging portions 12 and 13 on the forward and rearward sides of the non-ground-engaging portion 11, and the ground-engaging portions 12 and 13 are in contact with the ground when the wearer walks. In each of the ground-engaging portion 12 located on the heel side of the non-ground-engaging portion 11 (hereinafter referred to also as "heel-side ground-engaging portion 12") and the ground-engaging portion 13 located on the toe side of the non-ground-engaging portion 11 (hereinafter referred to also as "toe-side ground-engaging portion 13"), the outsole 4 partially covers the midsole 3 from the lower side. That is, as shown in FIG. 3 and FIG. 4, the midsole 3 includes a covered area 31 covered by the outsole 4 from the lower side, and an exposed area 32 not covered by the outsole 4 but being in an exposed state. In other words, the shoe sole surface 1a includes first areas 121 and 131 in which the outsole is exposed, and second areas 122 and 132 in which the midsole is exposed, in at least one of a forefoot portion and a heel portion.

As will be described later, the midsole 3 of this embodiment is formed of a polymer foam, which can easily densify only a specific area in a surface part. Therefore, the midsole 3 of this embodiment can exhibit excellent wear resistance even when the ground-engaging portion is constituted by a part of the midsole 3 together with the outsole 4. It is desirable that the first areas 121 and 131 and the second areas 122 and 132, which serve as the ground-engaging portions, exhibit excellent grip performance and cushioning performance. Accordingly, the exposed areas 32 of the midsole 3 in the heel-side ground-engaging portion 12 and the toe-side ground-engaging portion 13, which correspond to the second areas 122 and 132, each have an uneven surface formed on the lower surface side of the midsole 3.

The midsole 3 includes projections that protrude downward and recesses that are recessed upward in the exposed area 32. The uneven surface provided on the midsole 3 may include only a plurality of protruding dots provided on a flat surface, or include only a plurality of ridges provided on a flat surface. Further, the uneven surface provided on the midsole 3 may have only a flat surface with a plurality of portions recessed, or have only a plurality of grooves provided in a flat surface. The shapes of the projections and the shapes of the recesses are not particularly limited, and may each be, for example, a conical shape, a pyramid shape, a truncated conical shape, a truncated pyramid shape, or an irregular shape. In the case where the projections and the recesses are respectively the ridges and the grooves, their shapes are not particularly limited, and the ridges and the grooves may have, for example, a linear shape, a curved shape, a meandering shape, or a spiral shape. Further, the cross-sectional shapes of the ridges and the grooves are not particularly limited, either.

In the heel-side ground-engaging portion 12 and the toe-side ground-engaging portion 13, the outsole 4 also has an uneven surface on the lower surface side, and the uneven surface includes projections that project downward and recesses that are recessed upward. That is, the heel-side ground-engaging portion 12 and the toe-side ground-engaging portion 13 each are provided with the uneven surface to exhibit excellent grip performance, and the first areas 121 and 131 and the second areas 122 and 132 each are provided with the uneven surface.

It is preferable that the midsole 3 and the outsole 4 include the projections having a height (length in the downward direction) of 1 mm or more in the heel-side ground-engaging portion 12 and the toe-side ground-engaging portion 13. The height of the projections is more preferably 1.5 mm or more, particularly preferably 2 mm or more. The height of the projection is generally 10 mm or less.

The aspect ratio, which is a ratio (H/W) of the height (H) to the width (width at a proximal end: W) of the projection, is preferably 0.3 or more, more preferably 0.5 or more, further preferably 1.0 or more, particularly preferably 2.0 or more. The aspect ratio of the projection is generally 10 or less.

The projections of the midsole 3 may have distal ends not vertically aligned with the distal ends of the projections of the outsole 4. At least some of the projections of the midsole 3 may have their distal ends positioned upward of the distal ends of the projections of the outsole 4 so that they are not in contact with the ground when the shoe 1 is in a no-load state but come into contact with the ground when the shoe 1 is subjected to the weight of the wearer.

The midsole 3 includes a lower surface 3a having the uneven surface in the exposed area 32 but having a flat surface in the covered area 31. The outsole 4 includes a lower surface 4a having the uneven surface, but includes an upper surface 4b having no uneven surface. That is, in a contact area SX in which the upper surface 4b of the outsole 4 and the lower surface 3a of the midsole 3 are in contact with each other while being opposed to each other in the vertical direction, the respective surfaces have a flat shape. The outsole 4 and the midsole 3 of this embodiment are heat-fused to each other in this contact area SX.

The midsole 3 in this embodiment is composed of a polymer foam. The outsole 4 in this embodiment is composed of a thermoplastic elastomer. The midsole 3 and the outsole 4 in this embodiment are simultaneously molded using a single forming mold, as will be described in detail later. The midsole 3 and the outsole 4 are heat-fused to be integrated with each other in the contact area SX during this molding.

Now a description is given on a method of simultaneously molding the midsole 3 and the outsole 4. When the midsole 3 and the outsole 4 are simultaneously molded, performed for example are a preparation step of preparing a preformed product for forming the midsole 3 (hereinafter referred to also as a "first preformed product") and a preformed product for forming the outsole 4 (hereinafter referred to also as a "second preformed product"), and a thermal molding step of applying pressure to the first preformed product and the second preformed product in a heated state to give these products a certain shape and heat-fuse these products together. A pretreatment step of applying a binder to a surface of each of at least one of the first preformed product and the second preformed product to accelerate the heat-fusing in the thermal molding step may be performed between the preparation step and the thermal molding step.

In the preparation step, a foam slightly larger than the midsole 3 can be produced as the first preformed product for the midsole, and a flat plate-shaped sheet body having no uneven surface on both sides can be produced as the second preformed product for the outsole.

In the step of producing the first preformed product, performed can be producing a foam slightly larger than the first preformed product and removing excess portions from the foam to shape into the first preformed product. The foam can be produced, for example, by causing a polymer composition including a forming agent to foam in a forming mold having a molding space corresponding to the shape of the foam. To obtain the first preformed product by removing excess portions from the foam, the foam can be, for example, cut. With the cutting, the first preformed product having a cut surface with the sections of cells present thereon can be obtained, and thus the first preformed product easily exhibiting the anchor effect can be obtained.

The second preformed product produced in the preparation step can be a sheet body having a shape corresponding to the shape of the outsole 4 in plan view. In the step of producing the second preformed product, performed may be producing a flat plate-shaped raw material sheet having a larger area than that of the second preformed product and having an even thickness, and removing excess portions of the raw material sheet to obtain the second preformed product. The raw material sheet can be produced, for example, by injection-molding a thermoplastic elastomer for forming the outsole 4. To remove the excess portions from the raw material sheet, an edge tool such as a cutter knife or scissors can be used. To remove the excess portions from the raw material sheet, punching may be performed using, for example, a Thomson blade mold. In general, the shoes 1 even having the same design still need to have a plurality of different sizes available. The aforementioned method does not necessitate preparing a plurality of forming molds for producing the second preformed products of different sizes, and thus can reduce the cost for production. That is, the cost for producing shoes can be reduced by preparing one injection-molding mold that can produce raw material sheets each having an area larger than that of the second preformed product having the largest size required for producing the shoes 1 having different sizes. Even if the second preformed products are punched out of the raw material sheets, only a plurality of simple molds such as Thomson blade molds need to prepared, which can significantly reduce the cost for production as compared with the case where a plurality of injection-molding molds are prepared.

In this embodiment, the uneven surfaces of the midsole 3 and the outsole 4 can be formed in the thermal molding step, and the lower surfaces respectively of the first preformed product and the second preformed product do not need to each have such an uneven surface as to be provided on the lower surface 3a of the midsole 3 or the lower surface 4a of the outsole 4, but may each have a flat surface. That is, in this embodiment, an effect can be exhibited that the forming mold even if used to produce the first preformed product and the second preformed product can have a relatively simple structure.

The pretreatment step can be performed by applying the binder to the first preformed product and/or the second preformed product. The binder can be applied using a common tool such as a brush or a spray. The binder can be applied only to a part of a surface of the first preformed product and/or the second preformed product, or to the entire surface thereof. In the case where the binder is applied to the second preformed product, the binder may be applied to the raw material sheet before being processed to the second preformed product. It is preferable that the binder be applied to an area extending at least the entire contact area SX.

Figure 5A:
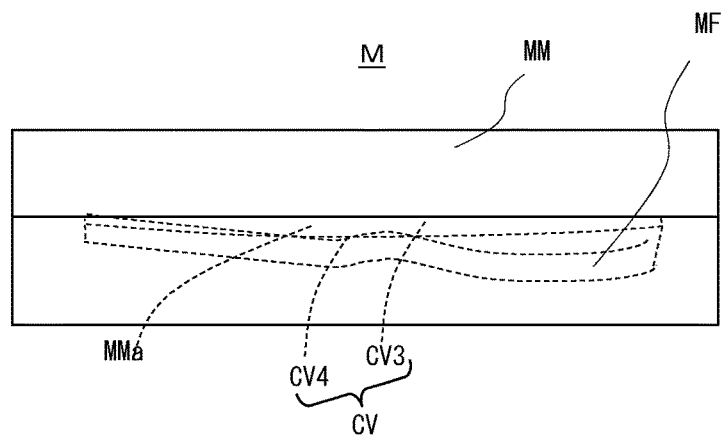
FIG. 5A is a schematic front view of a forming mold.
Figure 5B:
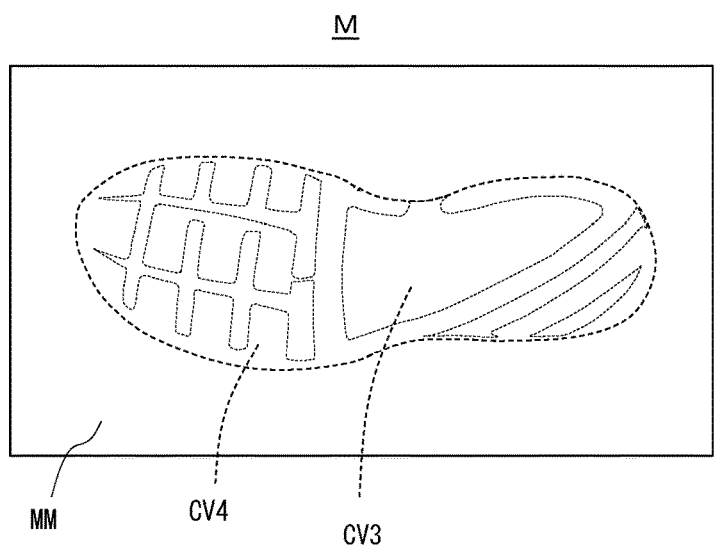
FIG. 5B is a schematic plan view of the forming mold.
Figure 5C:
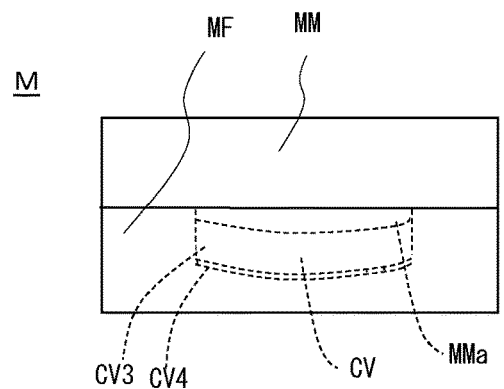
FIG. 5C is a schematic side view of the forming mold.

In the thermal molding step, for example, a forming mold M as shown in FIG. 5A, FIG. 5B, and FIG. 5C is used. As shown in the figures, the forming mold M is composed of a pair of molds respectively having molding surfaces that come into contact with each other when the forming mold M is closed. The forming mold M has a male mold MM and a female mold MF as the pair of molds. Each of the male mold MM and the female mold MF in this embodiment has a plate shape. The forming mold M is configured to be able to form a tightly closed molding space CV inside thereof by joining the male mold MM and the female mold MF to each other. The forming mold M is configured to be able to form the molding space CV corresponding to the shape formed by integration of the midsole 3 and the outsole 4 inside thereof when the forming mold M is closed. The molding space CV is constituted by a first space CV3 corresponding to the shape of the midsole 3, and a second space CV4 corresponding to the shape of the outsole 4.

The female mold MF has a molding recess MFa that is open on a side having the molding surface and that recesses in a thickness direction of the female mold MF. The molding recess MFa is formed so that its depth direction corresponds to the thickness direction of the midsole 3 and the outsole 4. The male mold MM has a molding projection MMa that projects from the molding surface and can project into the molding recess MFa of the female mold MF. The forming mold M is configured to be able to form the molding space CV inside thereof in the state where the molding projection MMa is located at an intermediate position in the depth direction of the molding recess MFa when the female mold MF and the male mold MM join to each other. That is, the forming mold M is configured so that the molding space CV can be defined by an inner wall surface of a bottom portion of the molding recess MFa and a lower surface of the molding projection MMa. The molding surface (inner wall surface) of the female mold MF has a bottom surface with projections and recesses having a shape or pattern in reverse relationship with the projections and recesses provided on the shoe sole surface 1a. The female mold MF includes the projections and the recesses on the bottom surface for forming the lower surfaces respectively of the first preformed product and the second preformed product into specific shapes.

Figure 6:
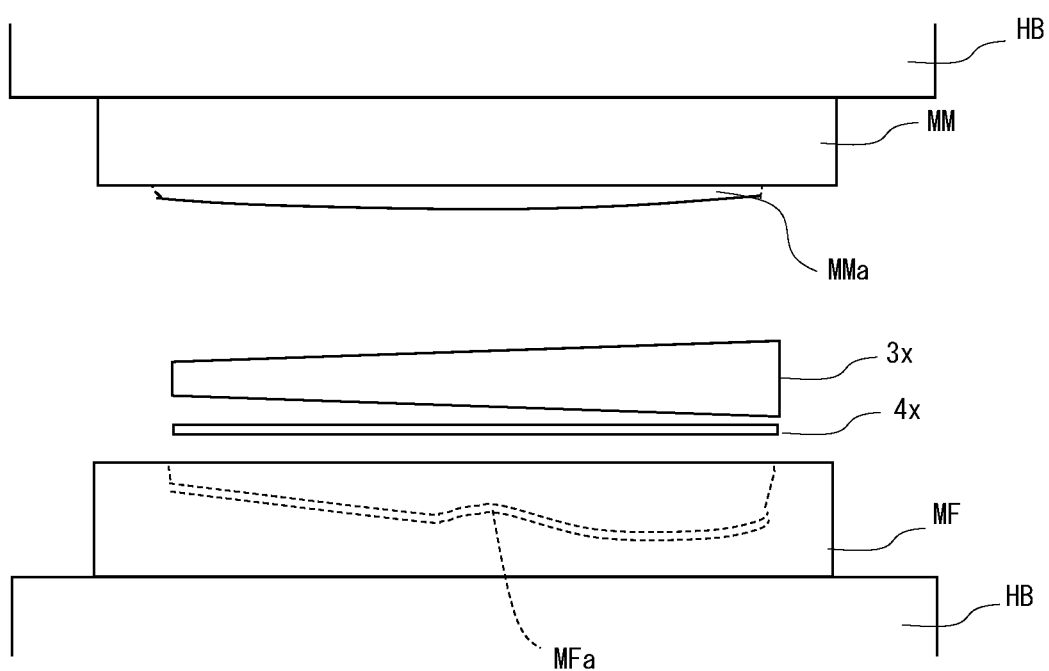
FIG. 6 is a schematic view showing thermal molding process using the forming mold.

In the thermal molding step of simultaneously molding the midsole 3 and the outsole 4 in this embodiment, as shown in FIG. 6, a method can be employed in which, for example, the forming mold M having a first formed product 3x and a second formed product 4x accommodated in the molding space CV is heated and pressed by a heat press machine having a pair of heat hot plates HB. Examples of the specific method of the thermal molding step employable herein include a method in which the forming mold M with the second formed product 4x placed in the second space CV4 and the first formed product 3x placed in the first space CV3 is placed between the hot plates HB, and heated and pressed by the hot plates HB in a direction in which the female mold MF and the male mold MM come close to each other.

It is advantageous in obtaining a formed product accurately reflecting the shape of the molding space CV if the forming mold M is heated to a high temperature to cause the first formed product 3x and the second formed product 4x to be easily deformable at the time of producing a formed product with the midsole 3 and the outsole 4 integrated together in the thermal molding step. It is advantageous also in obtaining a formed product with the midsole 3 and the outsole 4 firmly heat-fused to each other if the forming mold M has a high heating temperature in the thermal molding step. On the other hand, the high heating temperature of the forming mold M causes the second formed product 4x to exhibit excessive fluidity, possibly causing the thermoplastic elastomer forming the second formed product 4x to flow out of the second space CV4. That is, the high heating temperature of the forming mold M enables the molded article to have an overall shape with high accuracy, but might cause the midsole and the outsole both constituting the molded article to each have an outer shape with low accuracy.

In this embodiment, a certain thermoplastic elastomer is employed as a forming material of the outsole 4 to easily obtain a molded article having an accurate overall shape and including the midsole and the outsole each having an accurate individual shape.

The thermoplastic elastomer forming the outsole 4 in this embodiment satisfies both relational expressions (1) and (2) below when the complex viscosity is measured:

$$10 \text{ kPa·s} \leq \eta_{140} \leq 300 \text{ kPa·s} \tag{1}$$

$$\eta_{180} \leq 100 \text{ kPa·s} \tag{2}$$

where "$\eta_{140}$" in the relational expression (1) represents the complex viscosity (kPa·s) at 140° C. of the thermoplastic elastomer, and "$\eta_{180}$" in the relational expression (2) represents the complex viscosity (kPa·s) at 180° C. of the thermoplastic elastomer.

The thermoplastic elastomer having a complex viscosity at 140° C. ($\eta_{140}$) of 10 kPa·s or more can be suppressed from exhibiting excessive fluidity and can thus reduce a likelihood of flowing out of the second space CV4, even when the forming mold M is heated to a high temperature in the thermal molding step. Thus, in this embodiment, a pressed condition to cause high pressure to act between the first formed product 3x and the second formed product 4x can be employed in the thermal molding step, and a formed product having the midsole 3 and the outsole 4 firmly heat-fused to each other can be obtained. In more remarkably exhibiting such an effect, the complex viscosity at 140° C. ($\eta_{140}$) of the thermoplastic elastomer is preferably 15 kPa·s or more, more preferably 25 kPa·s or more, particularly preferably 50 kPa·s or more.

The thermoplastic elastomer having a complex viscosity at 140° C. ($\eta_{140}$) of 300 kPa·s or less enables the outsole 4 accurately reproducing the detailed shape of the forming mold M to be easily obtained in this embodiment. In more remarkably exhibiting such an effect, the complex viscosity at 140° C. ($\eta_{140}$) of the thermoplastic elastomer is preferably 280 kPa·s or less, more preferably 250 kPa·s or less, particularly preferably 220 kPa·s or less.

The thermoplastic elastomer having a complex viscosity at 180° C. ($\eta_{180}$) of 100 kPa·s or less enables the second formed product 4x (the raw material sheet) to be easily produced by such a method as injection molding. That is, the complex viscosity ($\eta_{180}$) of the thermoplastic elastomer satisfying the relational expression (2) facilitates the repetitive production of the second formed product 4x having an accurate outer shape. The complex viscosity ($\eta_{180}$) of the thermoplastic elastomer satisfying the relational expression (2) enables the production of the second formed product 4x having an accurate outer shape, and consequently enables the outsole 4 having an excellently accurate outer shape. In more remarkably exhibiting such an effect, the complex viscosity at 180° C. ($\eta_{180}$) of the thermoplastic elastomer is preferably 80 kPa·s or less, more preferably 60 kPa·s or less, particularly preferably 40 kPa·s or less. The complex viscosity at 180° C. ($\eta_{180}$) of the thermoplastic elastomer is preferably 2 kPa·s or more, more preferably 3 kPa·s or more, particularly preferably 4 kPa·s or more.

The complex viscosity can be measured based on JIS K 7244-4: 1999 (ISO 6721-4: 1994). Specifically, it can be measured using a dynamic viscoelasticity measuring instrument (for example, product name "Rheogel-E4000" manufactured by UBM Co., Ltd.). A measurement sample has a strip shape with a length of 33±3 mm, a width of 5±1 mm, and a thickness of 2±1 mm, and the measurement conditions can be as follows:

<Measurement Conditions>
Measurement mode: Tensile mode of a sinusoidal strain
Frequency: 10 Hz
Distance between chucks: 20 mm
Load: Automatic static load
Dynamic strain: 5 μm
Heating rate: 2° C./min The outsole 4 of this embodiment is formed in a substantially non-foamed state by such a thermoplastic elastomer. The outsole 4 may be in a foamed state including a slight amount of cells, but is preferably in a non-foamed state in terms of its strength and wear resistance. Specifically, it is preferable that the outsole 4 be formed so that, when the outsole 4 is cut at several randomly selected locations (for example 5 locations) to have cut surfaces corresponding to the vertical surfaces for the observation of the cut surfaces, the area ratio of the cells to the cut surfaces is 5% or less. The area ratio in the outsole 4 is preferably 4% or less, further preferably 3% or less, particularly preferably 1% or less.

A type A durometer hardness (at 23° C.; instantaneous value) measured based on a JIS standard (JIS K6253-3) of the outsole 4 is preferably 55 or more, more preferably 60 or more. The type A durometer hardness of the outsole 4 is preferably 85 or less, more preferably 80 or less, particularly preferably 75 or less.

As the thermoplastic elastomer for forming the outsole 4 as aforementioned, for example, one or more selected from a group consisting of an olefin-based thermoplastic elastomer (TPO), a styrene-based thermoplastic elastomer (TPS), an amide-based thermoplastic elastomer (TPA), a urethane-based thermoplastic elastomer (TPU), an ester-based thermoplastic elastomer (TPC), and the like can be employed.

The thermoplastic elastomer for forming the outsole 4 is preferably any of an olefin-based thermoplastic elastomer (TPO), a urethane-based thermoplastic elastomer (TPU), and a styrene-based thermoplastic elastomer (TPS).

The olefin-based thermoplastic elastomer (TPO) preferably has a constituent unit derived from propylene and a constituent unit derived from ethylene or α-olefin having 4 to 30 carbon atoms that are included in a single molecular structure. The olefin-based thermoplastic elastomer (TPO) preferably has a microstructure in which nano-order crystalline portions having a spiral shape are connected to each other to form a mesh structure with which amorphous portions are covered. A melt mass-flow rate (MFR) measured based on JIS K7210-1 under the conditions of 230° C. and 21.18 N of the olefin-based thermoplastic elastomer (TPO) is preferably 0.5 g/10 mins or more, more preferably 1.0 g/10 mins or more. The MFR of the TPO is preferably 10 g/10 mins or less, more preferably 8.0 g/10 mins or less.

The styrene-based thermoplastic elastomer (TPS) preferably has a styrene content of 20 mass % or more and 40 mass % or less. A melt mass-flow rate (MFR) measured based on JIS K7210-1 under the conditions of 230° C. and 21.18 N of the styrene-based thermoplastic elastomer (TPS) is preferably 0.5 g/10 mins or more, more preferably 1.0 g/10 mins or more. The MFR of the TPS is preferably 10 g/10 mins or less, more preferably 8.0 g/10 mins or less.

The thermoplastic elastomer preferably has a microphase separation structure including a matrix and a plurality of domain particles dispersed in the matrix. In order to cause the thermoplastic elastomer to exhibit excellent fluidity during heating, the matrix preferably includes a crystalline polyolefin having a relatively low melt viscosity among other common polymers, and preferably includes a high-density polyethylene or polypropylene, particularly preferably includes polypropylene, as the crystalline polyolefin. The polypropylene included in the matrix is preferably any of homo polypropylene and block polypropylene. Further, the domain particles preferably include a crosslinked elastomer. The domain particles including the crosslinked elastomer are not heat-molten even when heated to a high temperature. The thermoplastic elastomer including the domain particles that include the crosslinked elastomer can be suppressed from having excessive fluidity during heat melting.

Figure 7:
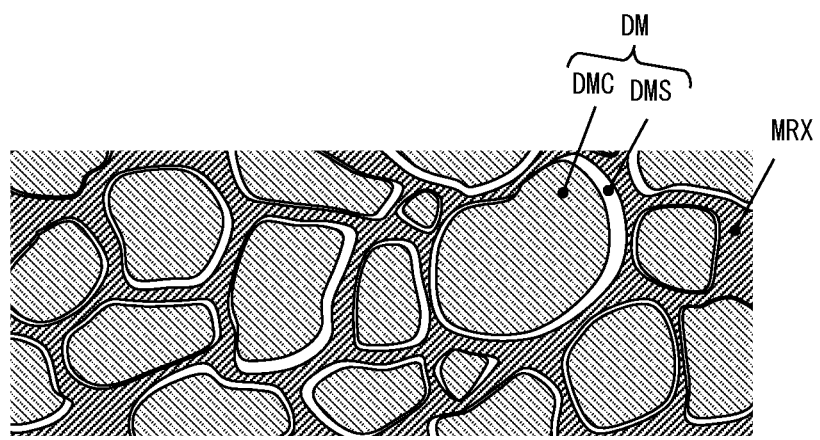
FIG. 7 is a schematic view of a state where a thermoplastic elastomer has a microphase separation structure.

Even in the case where the styrene-based thermoplastic elastomer is employed as the thermoplastic elastomer, the function of the domain particles or the function of the crystalline polyolefin can be exhibited. The styrene-based thermoplastic elastomer preferably has a microphase separation structure as schematically shown in FIG. 7. That is, the styrene-based thermoplastic elastomer preferably includes a matrix MRX, and a plurality of domain particles DM dispersed in the matrix. The styrene-based thermoplastic elastomer forming the outsole preferably has the matrix MRX including a styrene-based polymer, preferably has the matrix MRX including a poly-α-methyl styrene-based polymer. Examples of the styrene-based polymer include poly-α-methylstyrene, poly-α-methyl-o-methylstyrene, poly-α-methyl-m-methylstyrene, poly-α-methyl-p-methylstyrene, poly-α-methyl-2,6-dimethylstyrene, poly-α-methyl-2,4-dimethylstyrene, and poly-α-methyl-2,4,6-trimethylstyrene. Among these, poly-α-methylstyrene is preferably included in the matrix MRX.

At least part of the plurality of domain particles DM of the styrene-based thermoplastic elastomer preferably includes core-shell particles each including a core portion and a shell portion covering the core portion. It is preferable that at least part of the core-shell particles each have the core portion fully covered with the shell portion. It is preferable that a core portion DMC of the core-shell particle include a crosslinked elastomer and a shell portion DMS of the core-shell particle include a crystalline polyolefin. Since the shell portion DMS of the core-shell particle includes the crystalline polyolefin, the shell portion DMS becomes less viscose than the core portion DMC or the matrix MRX when the thermoplastic elastomer is heated, to thereby allow the thermoplastic elastomer to exhibit excellent fluidity.

In order to cause the thermoplastic elastomer to exhibit excellent fluidity during heating, the crystalline polyolefin included in the shell portion DMS is preferably a high-density polyethylene or polypropylene. In the case where polypropylene is employed as the crystalline polyolefin, the polypropylene may be homo polypropylene that is a propylene homo polymer, random polypropylene that is a random copolymer of propylene and ethylene, or block polypropylene that is a block copolymer of propylene and ethylene. The polypropylene included in the shell portion DMS is preferably any of homo polypropylene and block polypropylene. Since these polypropylenes each have a melting point of about 160° C., which is the midpoint between 140° C. and 180° C., the shell portion DMS formed of such a polypropylene enables the complex viscosity at 180° C. ($\eta_{180}$) of the thermoplastic elastomer to be easily adjusted to a low value. Further, the shell portion DMS formed of such a polypropylene enables the complex viscosity at 140° C. ($\eta_{140}$) of the thermoplastic elastomer to be easily adjusted to a desired value.

The crosslinked elastomer included in the core portions DMC of the domain particles DM in the thermoplastic elastomer is not particularly limited, but is preferably a styrene-based elastomer. That is, the crosslinked elastomer included in the core portions DMC is preferably a crosslinked elastomer that is formed by crosslinking a styrene-based elastomer with a crosslinking agent. Examples of the styrene-based elastomer include styrene-ethylene-butylene copolymer (SEB), styrene-butadiene-styrene copolymer (SBS), a hydrogenated product of SBS (styrene-ethylene-butylene-styrene copolymer (SEBS)), styrene-isoprene-styrene copolymer (SIS), a hydrogenated product of SIS (styrene-ethylene-propylene-styrene copolymer (SEPS)), styrene-isobutylene-styrene copolymer (SIBS), styrene-butadiene-isoprene-styrene copolymer (SBIS), a hydrogenated product of SBIS (styrene-ethylene-ethylene/propylene-styrene copolymer (SEEPS)), styrene-butadiene-styrene-butadiene copolymer (SBSB), and styrene-butadiene-styrene-butadiene-styrene copolymer (SBSBS). Among these, the crosslinked elastomer included in the core portions DMC is preferably a crosslinked elastomer formed by crosslinking SEBS or SEEPS, particularly preferably a crosslinked elastomer formed by crosslinking SEEPS, in order to enable the thermoplastic elastomer to exhibit excellent wear resistance.

It is preferable that the thermoplastic elastomer be formed by supplying the aforementioned styrene-based polymer along with a polypropylene resin and a poly-α-methylstyrene-based polymer in a kneading apparatus such as an extruder, followed by dynamically crosslinking the styrene-based polymer in the kneading apparatus. When the dynamic crosslinking is performed with the kneading apparatus to produce the thermoplastic elastomer, all of the styrene-based polymer, polypropylene, and the poly-α-methylstyrene-based polymer are not necessarily supplied simultaneously in the kneading apparatus, but part of the styrene-based polymer, polypropylene, and the poly-α-methylstyrene-based polymer may be primarily kneaded in the kneading apparatus to obtain a primarily kneaded product, followed by adding the remaining polymer(s) to the primarily kneaded product for further secondary kneading. A preferable method for producing the thermoplastic elastomer is a method in which polypropylene and the styrene-based polymer are molten and kneaded with the crosslinking agent to obtain the primarily kneaded product, followed by adding the poly-α-methylstyrene-based polymer to the primarily kneaded product for secondary kneading.

In the case where the outsole 4 is formed of the thermoplastic elastomer as described above, it is preferable that the polymer foam forming the midsole 3 include a polymer having a crystal melting peak within a range of 60° C. to 130° C., and that the polymer be crosslinked in the polymer foam.

Whether the polymer included in the polymer foam has the crystal melting peak as described above can be confirmed by differential scanning calorimetry (DSC) on the polymer. For example, it can be confirmed that the aforementioned polymer is included in the midsole 3, by collecting a measurement sample of about 5 mg from the midsole 3, performing heat flux differential scanning calorimetry (heat flux DSC) on the measurement sample, and confirming that the obtained DSC curve shows an endothermic peak within a range of 60° C. to 130° C. The endothermic peak temperature of the measurement sample can be determined by the method specified in JIS K7121-1987 "Testing Methods for Transition Temperatures of Plastics", and is determined by the measurement at a heating rate of 10° C./min.

The polymer included in the polymer foam is not particularly limited, but is preferably a styrene-based thermoplastic elastomer (TPS), an olefin-based thermoplastic elastomer (TPO), or an ethylene-vinyl acetate copolymer (EVA). That is, the polymer foam forming the midsole 3 is preferably a polymer foam obtained by crosslinking a polymer composition including TPS, TPO, or EVA and causing the polymer composition to foam. It is preferable that the polymer foam forming the midsole 3 include a polymer excellent in affinity with the outsole, in order to improve fusibility between the midsole and the outsole. The midsole of this embodiment may include EVA, which is relatively frequently used for conventional midsoles and known to satisfy the characteristics required for the midsoles.

A melt mass-flow rate (MFR) measured based on JIS K6924-1 under the conditions of 190° C. and 21.18 N of the EVA included in the polymer foam forming the midsole 3 is preferably 0.5 g/10 mins or more, more preferably 1.0 g/10 mins or more. The MFR of the EVA is preferably 10 g/10 mins or less, more preferably 5.0 g/10 mins or less. A content of vinyl acetate (VA) measured based on JIS K6924-1 in the EVA is preferably 5 mass % or more. A content of vinyl acetate (VA) in the ethylene-vinyl acetate copolymer is preferably 10 mass % or less, more preferably 8 mass % or less.

A binder optionally used for heat-fusing the midsole 3 and the outsole 4 to each other is not particularly limited in kind, and can be appropriately selected depending on the material of the midsole 3 or the outsole 4. In the case where a difference in polarity is found between the polymer foam forming the midsole 3 and the thermoplastic elastomer forming the outsole 4, a binder that includes a polymer having a polarity therebetween is advantageous in firmly heat-fusing the midsole 3 and the outsole 4 to each other.

As has been described above, since the thermoplastic elastomer forming the outsole 4 has a specific complex viscosity in this embodiment, the molding condition in which the inside of the forming mold reaches a higher temperature and a higher pressure than before can be employed in the thermal molding step. Therefore, in this embodiment, the midsole 3 and the outsole 4 can be directly heat-fused to each other without use of a binder even in the case where a binder seems necessary in consideration of the kinds of polymers respectively forming the midsole 3 and the outsole 4. Thus, this embodiment can expand the options of polymers forming the midsole 3 or the outsole 4, and enables the shoe 1 to easily exhibit specific characteristics.

In this embodiment, the temperature condition and the pressure condition can be prevented from being restricted in the thermal molding step as described above, and thus the midsole 3 can easily have different degrees of foaming between its surface portion and central portion. Since, as has been described above, the thermoplastic elastomer forming the outsole 4 does not exhibit excessive fluidity during heat-fusing in this embodiment, the midsole 3 and the outsole 4 can be integrated with each other under high pressure in the thermal molding step. Thus, for example, the first formed product 3x constituting the midsole 3 can be caused to foam at a high expansion ratio, followed by being firmly compressed in the thermal molding step, to densify a portion of the first forming product 3x close to the wall surface of the forming mold. Accordingly, the portions of the midsole 3 respectively constituting the second areas 122 and 132 of the heel-side ground-engaging portion 12 and the toe-side ground-engaging portion 13 can be selectively compressed in the thermal molding step to increase the apparent density of these portions as compared to other portions. In this embodiment, for example, a non-foamed film having a portion with a maximum thickness of 0.2 mm or more, or a non-foamed film having a portion with a maximum thickness of 0.4 mm or more can also be formed on the distal ends of the projections provided in the second area 122 of the heel portion or the projections provided in the second area 132 of the forefoot portion, in order to cause the shoe sole to exhibit high wear resistance and grip performance. The non-foamed film that can be provided on the lower surface 3a of the midsole 3 in this embodiment generally has a thickness of 1 mm or less.

In this embodiment, the apparent densities of the portions respectively constituting the second areas 122 and 132 are made higher than the apparent density of the entire midsole to thereby enable the shoe sole to exhibit excellent wear resistance and grip performance. The apparent density (D0) of the entire midsole can be obtained by dividing the mass of the entire midsole by the volume thereof. The apparent density (D1) of the portions constituting the second areas 122 and 132 can be obtained by the mass and volume of a sliced piece obtained by slicing the midsole 3 so as to have a thickness substantially equal to the thickness of the outsole 4 (apparent density (D1) of portions constituting second areas=Mass of sliced piece/Volume of sliced piece). That is, when the thickness of the outsole 4 in the contact area SX between the upper surface 4b and the shoe sole surface 1a is, for example, 3 mm, the midsole 3 is sliced to have a thickness of 3 mm from the shoe sole surface 1a in the second areas 122 and 132, to obtain the apparent density (D1) based on the mass and the volume of the sliced piece obtained.

In the shoe 1 of this embodiment, the members other than the midsole 3 and the outsole 4, such as the upper 2, are not particularly limited, and can be those used for conventional shoes.

In this embodiment, the shoe according to the present invention is exemplified as described above, but the present invention is not limited to the aforementioned exemplification in any way, and various modifications can be made without departing from the gist of the present invention.

EXAMPLES

Next, the present invention will be described in more detail by way of Examples, without limitation thereto. A forming mold was prepared for producing a molded article including a rectangular plate-shaped base having a length of 10 cm, a width of 10 cm. and a thickness of 4 mm, and a plurality of ridges provided on one side of the base. The forming mold prepared is constituted by a pair of metal plates, one of which is a simple flat plate and the other of which has one side engraved to the shape of the molded article as aforementioned. Specifically, the forming mold prepared includes one metal plate one side of which has an engraved part that has a length of 10 cm, a width of 10 cm, and a depth of 4 mm and further has a plurality of grooves engraved in the bottom of the engraved part. The plurality of grooves provided in the bottom of the forming mold each have a square shape in cross section and has a width and a depth of 2 mm. The metal plate thus engraved was placed on a table with its upper surface open, and a thermoplastic elastomer sheet having a length of 10 cm, a width of 5 cm, and a thickness of 2 mm (the sheet corresponding to the second formed body $4x$) was placed on the bottom of the carved part to cover the grooves. Further, a polymer foam sheet made of EVA (a length of 10 cm, a width of 5 cm, and a thickness of 8 mm: the sheet corresponding to the first formed product $3x$) was placed on the thermoplastic elastomer sheet, and the other metal plate (flat plate) was placed thereon to have the thermoplastic elastomer sheet and the polymer foam sheet sandwiched between these two metal plates from above and below. This was placed in a heat press machine, and hot-pressed at 160° C. for 5 minutes (thermal molding step). After the hot pressing, the mold was sufficiently cooled to take a molded article out of the mold. The cross-sectional area (A1) of a groove formed in the forming mold and the cross-sectional area (A2) of the corresponding ridge formed on the molded article by the groove were used to obtain the filling rate of the thermoplastic elastomer using the expression below. The result in which the filling rate was 50% or more was judged as "A", and the result in which the filling rate was less than 50% was judged as "F".

Filling rate: $F$ (%)=$(A2)/(A1) \times 100\%$

Further, the width (W1: cm) of the thermoplastic elastomer sheet in the molded article and the width (5 cm) of the thermoplastic elastomer sheet before being molded were used to obtain the flowability of the thermoplastic elastomer sheet using the expression below:

Flowability: $\Delta d$ (mm)=$(W1 \cdot 5) \times 10$

Figure 8:
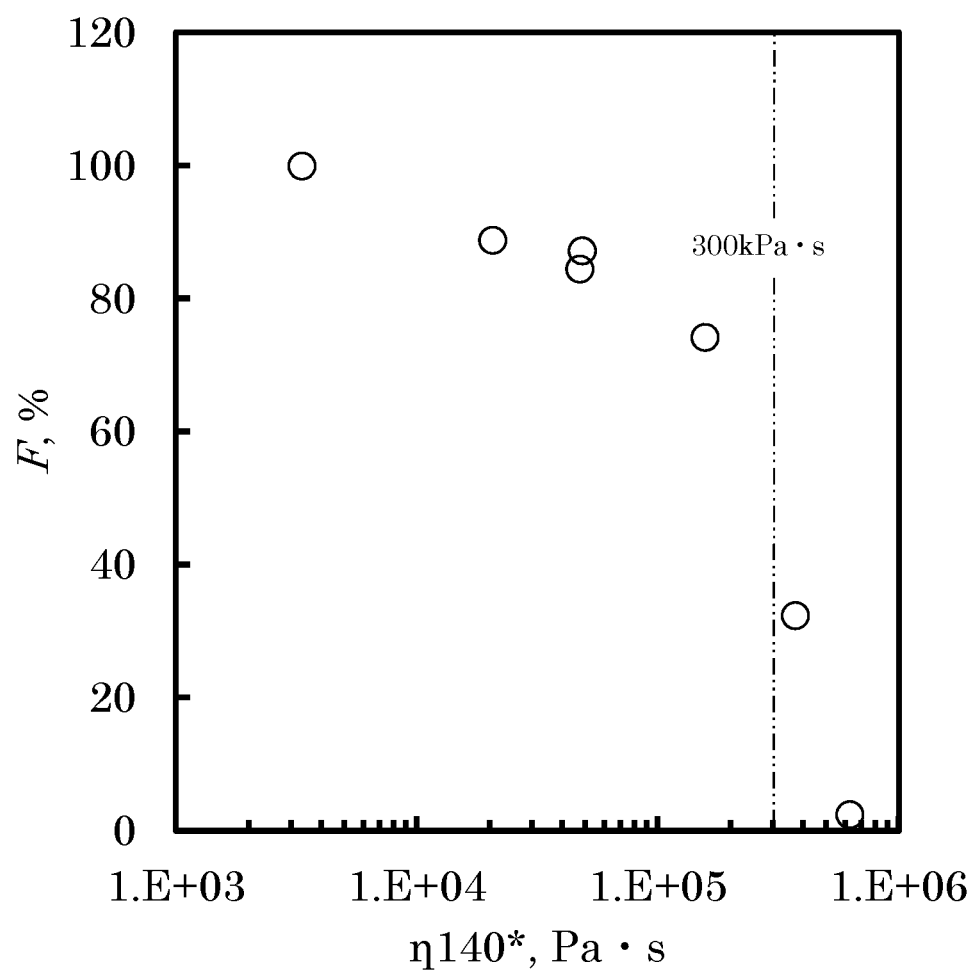
FIG. 8 is a view showing evaluation results in Examples (a graph showing the relationship between the complex viscosity and the filling performance into the mold, of the thermoplastic elastomer forming the outsole).
Figure 9:
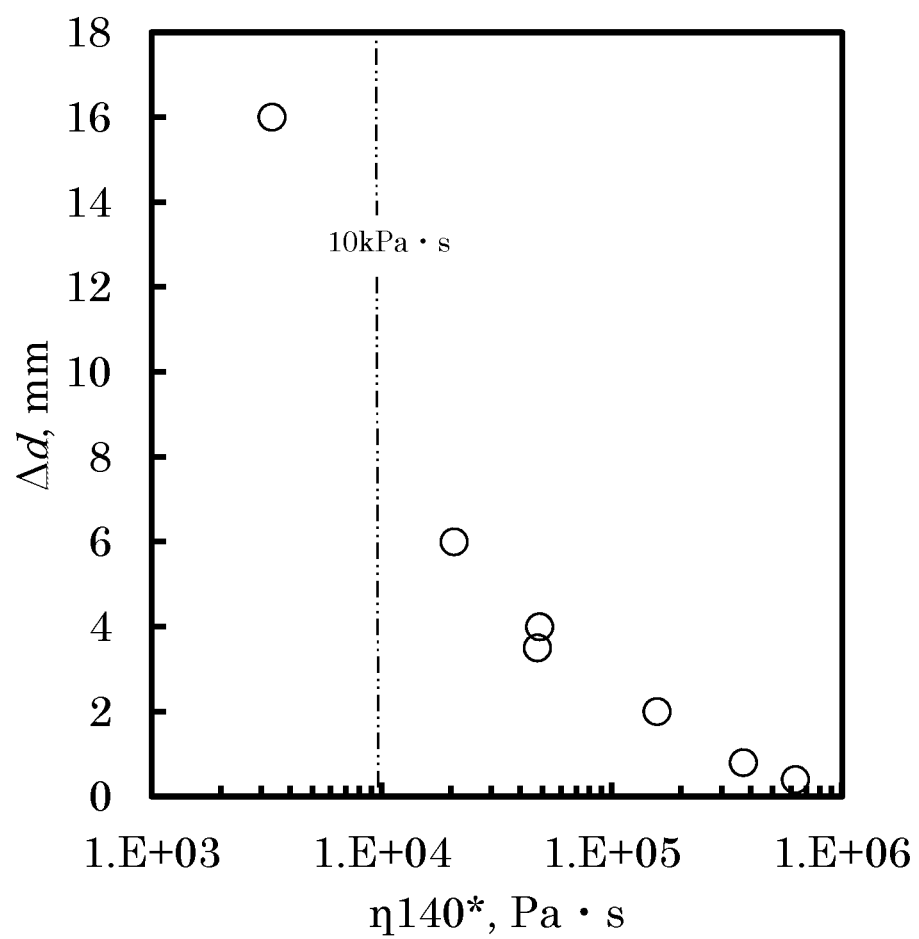
FIG. 9 is a view showing evaluation results in Examples (a graph showing the relationship between the complex viscosity and the flow rate at the time of molding, of the thermoplastic elastomer forming the outsole).

Only the material of the thermoplastic elastomer sheet used was changed to obtain the filling rate (F) and the flowability ($\Delta d$) in a manner as aforementioned. The result in which the flowability was 10 mm or less was judged as "A", and the result in which the flowability was more than 10 mm was judged as "F". Further, for each thermoplastic elastomer sheet, the complex viscosities at 140° C. and 180° C. were determined. These results are shown in FIG. 8, FIG. 9, and Table 1 below.

The abbreviations for the materials in the table are as follows.
TPU1: Urethane-based thermoplastic elastomer (ether-based polyurethane)
TPO1: Olefin-based thermoplastic elastomer based on propylene
TPS1: Styrene-based thermoplastic elastomer (SEBS)
M/D: Thermoplastic elastomer in which core-shell domain particles each constituted by a shell portion including polypropylene and a core portion including a crosslinked elastomer are dispersed in a matrix including poly α-methylstyrene
TPU2: Urethane-based thermoplastic elastomer (ether-based polyurethane)
XL-E: Crosslinked elastomer (non-thermoplastic)
EVA1: Ethylene-vinyl acetate copolymer The results shown in these figures also reveal that shoes of high quality can be efficiently and easily produced if the complex viscosity of the thermoplastic elastomer forming the outsole falls within a specific range.

REFERENCE SIGNS LIST

1: Shoe
2: Upper material
3: Midsole
4: Outsole

The invention claimed is:
1. A shoe comprising:
a midsole formed of a polymer foam; and
an outsole formed of a thermoplastic elastomer, wherein
the thermoplastic elastomer forming the outsole includes at least one selected from the group consisting of an olefin-based thermoplastic elastomer (TPO), an urethane-based thermoplastic elastomer (TPU), and a styrene-based thermoplastic elastomer (TPS), and further comprises a matrix and a plurality of domain particles dispersed in the matrix,
the plurality of domain particles comprise a crosslinked elastomer, and
the matrix comprises polypropylene,
the shoe comprises a shoe sole surface comprising a forefoot portion and a heel portion,
at least one of the forefoot portion and the heel portion comprises: a first area with the outsole exposed on the shoe sole surface; and a second area with the midsole exposed on the shoe sole surface,
a portion of the midsole constituting the second area has an apparent density that is higher than an apparent density of the entire midsole,
the second area has a ground-engaging portion formed of the midsole,

TABLE 1

|  |  | Ex. 1 | Ex. 2 | Ex. 3 | Ex. 4 | C. Ex. 1 | C. Ex. 2 | C. Ex. 3 |
|---|---|---|---|---|---|---|---|---|
| TPE sheet | Material | TPU1 | TPO1 | TPS1 | M/D | TPU2 | XL-E | EVA1 |
|  | Hardness (durometer A) | 80 | 72 | 73 | 63 | 95 | 70 | 97 |
|  | Density (g/cm³) | 1.11 | 0.87 | 0.91 | 0.91 | 1.15 | 1.15 | 0.93 |
|  | η140 (kPa · s) | 47.4 | 20.6 | 157.0 | 48.5 | 372.0 | 626.0 | 3.3 |
|  | η180 (kPa · s) | 3.6 | 2.5 | 32.0 | 7.9 | 11.0 | 572.0 | 0.7 |
| Filling rate | Filling rate (%) | 84.4 | 88.8 | 74.2 | 87.2 | 32.3 | 2.4 | 99.9 |
|  | Judge/A ≥ 50% | A | A | A | A | F | F | A |
| Flowability | Flowability (mm) | 4 | 6 | 2 | 4 | 0.8 | 0.4 | 16 |
|  | Judge/A ≤ 10 mm | A | A | A | A | A | A | F | the first area and the second area are flush with each other when viewed as a cross section along the lengthwise direction of the shoe, the outsole and the midsole are heat-fused to each other, and the thermoplastic elastomer has a complex viscosity at 140° C. ($\eta_{140}$) and a complex viscosity at 180° C. ($\eta_{180}$) that satisfy both relational expressions (1) and (2) below:

$$10 \text{ kPa·s} \leq \eta_{140} \leq 300 \text{ kPa·s} \tag{1}$$

$$\eta_{180} \leq 100 \text{ kPa·s} \tag{2}$$

2. The shoe according to claim 1, wherein each of the first area and the second area has an uneven surface.

3. The shoe according to claim 2, wherein
the polymer foam forming the midsole comprises a crosslinked polymer, and
the polymer has a crystal melting peak within a range of 60° C. to 130° C.

4. The shoe according to according to claim 2, wherein
at least part of the plurality of domain particles are core-shell particles,
the matrix comprises poly-α-methylstyrene, and
the core-shell particles each comprise a core portion comprising a crosslinked elastomer, and a shell portion comprising polypropylene.

5. The shoe according to claim 1, wherein
the polymer foam forming the midsole comprises a crosslinked polymer, and
the polymer has a crystal melting peak within a range of 60° C. to 130° C.

6. The shoe according to according to claim 5, wherein
at least part of the plurality of domain particles are core-shell particles,
the matrix comprises poly-α-methylstyrene, and
the core-shell particles each comprise a core portion comprising a crosslinked elastomer, and a shell portion comprising polypropylene.

7. The shoe according to according to claim 1, wherein
at least part of the plurality of domain particles are core-shell particles,
the matrix further comprises poly-α-methylstyrene, and
the core-shell particles each comprise a core portion comprising a crosslinked elastomer, and a shell portion comprising polypropylene.

* * * * *